United States Patent
Sugiura

(10) Patent No.: US 9,580,025 B2
(45) Date of Patent: Feb. 28, 2017

(54) THERMAL INSULATING SHEET, SHEET FOR USE IN TRUCK BED, AND THERMAL INSULATING CASE

(71) Applicant: FUTABA SANSHO CO., LTD., Aichi (JP)

(72) Inventor: Nobuki Sugiura, Aichi (JP)

(73) Assignee: FUTABA SANSHO CO., LTD., Aichi (JP)

( * ) Notice: Subject to any disclaimer, the term of this patent is extended or adjusted under 35 U.S.C. 154(b) by 0 days.

(21) Appl. No.: 14/898,923

(22) PCT Filed: Jan. 8, 2014

(86) PCT No.: PCT/JP2014/050146
§ 371 (c)(1),
(2) Date: Dec. 16, 2015

(87) PCT Pub. No.: WO2014/203544
PCT Pub. Date: Dec. 24, 2014

(65) Prior Publication Data
US 2016/0144804 A1    May 26, 2016

(30) Foreign Application Priority Data
Jun. 20, 2013    (JP) .................................. 2013-129691

(51) Int. Cl.
*B60R 13/08*    (2006.01)
*B32B 5/26*    (2006.01)
(Continued)

(52) U.S. Cl.
CPC ................ *B60R 13/08* (2013.01); *B32B 3/04* (2013.01); *B32B 3/06* (2013.01); *B32B 3/266* (2013.01);
(Continued)

(58) Field of Classification Search
CPC ... B60R 13/08; B60R 13/01; B60R 2013/016; B60J 5/065; B62D 33/02;
(Continued)

(56) References Cited

U.S. PATENT DOCUMENTS

| | | | | |
|---|---|---|---|---|
| 4,420,521 A | * | 12/1983 | Carr | ........................ A41D 31/02 2/272 |
| 5,431,979 A | * | 7/1995 | Dellinger | .................. B32B 5/26 428/101 |
| 2008/0233383 A1 | * | 9/2008 | Handwerker | ............. B32B 3/28 428/313.3 |

* cited by examiner

*Primary Examiner* — Joseph D Pape
*Assistant Examiner* — Dana Ivey
(74) *Attorney, Agent, or Firm* — Takeo Ohashi

(57) ABSTRACT

To provide a thermal insulating sheet, a sheet for use in a truck bed, and a thermal insulating case having superior easiness to handle while having a high thermal insulation ability. A thermal insulating sheet 1 comprises a laminated member comprising a tarpaulin sheet 10, a plurality of synthetic resin nonwoven fabric sheets 11*a*, 11*b*, and polyester canvas 12, with the plurality of synthetic resin nonwoven fabric sheets 11*a* and 11*b* being provided between the tarpaulin sheet 10 and the polyester canvas 12. A perimeter the laminated member possesses at least a part where at least the tarpaulin sheet and the polyester canvas are fuse-bonded, and remaining parts where the laminated member is stitched together. The polyester canvas possesses one or more through holes, through which air can enter into and exit out of the laminated member, whereas the tarpaulin sheet does not possess any through holes.

20 Claims, 11 Drawing Sheets

(51) Int. Cl.
*B32B 3/06* (2006.01)
*B60P 1/28* (2006.01)
*B32B 5/02* (2006.01)
*B60R 13/01* (2006.01)
*B62D 33/02* (2006.01)
*B32B 5/06* (2006.01)
*B32B 5/08* (2006.01)
*B32B 27/12* (2006.01)
*B32B 27/30* (2006.01)
*B32B 3/04* (2006.01)
*B32B 3/26* (2006.01)
*E01C 19/08* (2006.01)

(52) U.S. Cl.
CPC ............ *B32B 5/02* (2013.01); *B32B 5/022* (2013.01); *B32B 5/06* (2013.01); *B32B 5/08* (2013.01); *B32B 5/26* (2013.01); *B32B 27/12* (2013.01); *B32B 27/304* (2013.01); *B60P 1/286* (2013.01); *B60R 13/01* (2013.01); *B62D 33/02* (2013.01); *B32B 2255/02* (2013.01); *B32B 2255/26* (2013.01); *B32B 2260/021* (2013.01); *B32B 2260/046* (2013.01); *B32B 2262/0253* (2013.01); *B32B 2262/0276* (2013.01); *B32B 2307/304* (2013.01); *B32B 2307/306* (2013.01); *B32B 2307/554* (2013.01); *B32B 2307/712* (2013.01); *B32B 2307/714* (2013.01); *B32B 2307/7265* (2013.01); *B32B 2307/75* (2013.01); *B32B 2439/62* (2013.01); *B32B 2439/70* (2013.01); *B32B 2439/80* (2013.01); *B32B 2556/00* (2013.01); *B32B 2605/00* (2013.01); *B60R 2013/016* (2013.01); *E01C 19/08* (2013.01)

(58) Field of Classification Search
CPC .. B32B 5/022; B32B 3/06; B32B 5/26; B32B 2605/00; B32B 2307/304; B32B 2556/00; B32B 2262/0276; B60P 1/286; E01C 19/08
USPC ...................................................... 296/39.2
See application file for complete search history.

THERMAL INSULATING SHEET, SHEET FOR USE IN TRUCK BED, AND THERMAL INSULATING CASE

TECHNICAL FIELD

The present invention relates to a thermal insulating sheet, a sheet for use in a truck bed, and a thermal insulating case and, more specifically, to a thermal insulating sheet used for covering and thermally insulating materials such as an asphalt mixture or a medical agent, food and drink, and the like, and to a sheet for use in a truck bed and a thermal insulating case formed of such a thermal insulating sheet.

BACKGROUND ART

In various industrial materials, there is a case where retention of the temperature during storage or transport is required for maintaining quality and workability. For example, the asphalt mixture is significantly lowered in a workability when the temperature is lowered. Therefore, a temperature decrease is required to be minimized when the asphalt mixture is transported from a manufacturing site such as a plant to a building site such as a construction site by a truck. Generally, in the related art, countermeasures such as covering with two general-purpose sheets for use in a truck bed in an overlapped manner or spreading a felt sheet under the asphalt mixture have been taken.

However, these countermeasures have problems that a sufficient thermal insulation ability cannot be obtained even though two general purpose sheets are overlapped, and that the felt sheet absorbs water and further lowers the temperature of the asphalt mixture. Accordingly, the present inventor has invented an asphalt thermal insulating sheet having a high thermal insulation ability as described in Patent Literature 1. The asphalt thermal insulating sheet is a laminate sheet composed of four sheets. The four sheets comprise a sheet formed of a tarpaulin cloth, a sheet formed of a polyester canvas, both having a rectangular shape and overlapped with each other, and two sheets formed of polypropylene having a width narrower than the above-described two sheets and being interposed therebetween. The sheet formed of the tarpaulin cloth and the sheet formed of the polyester canvas of the laminate sheet are heat sealed along two long sides thereof, while one of short sides of the laminated four sheets is stitched together and the other short side is stitched or heat sealed together.

CITATION LIST

Patent Literature

PTL1: Japanese Utility Model Registration No. 3175500

SUMMARY OF THE INVENTION

Technical Problem

The asphalt thermal insulating sheet of PTL1 has a very high thermal insulation ability. However, due to the high thermal insulation ability, air accumulated between the laminated sheets may expand when being mounted on a bed of the truck and travelling, and thus the entire sheet may swelled up like a balloon. In this manner, there is a problem that a work of putting the thermal insulating sheet away by dismounting and folding or the like of the sheet becomes difficult due to expansion of the sheet.

In addition, when arranging the asphalt thermal insulating sheet actually on the bed of the truck, mounting and dismounting the sheet in a manner that ensures a high thermal insulation ability are not necessarily easy.

The sheet described in PTL1 has a potential to be applied to thermally insulate (cold insulation) various materials in addition to asphalt because the sheet brings out superior thermal insulation ability at a temperature range higher than an ambient temperature and at a temperature range lower than the ambient temperature. However, with a sheet form described in PTL1, easiness to handle cannot be achieved sufficiently when covering various material and a high thermal insulation ability cannot be necessarily achieved.

In view of such circumstances, it is an object of the present invention to provide a thermal insulating sheet, a sheet for use in a truck bed, and a thermal insulating case having superior easiness to handle while having a high thermal insulation ability.

Solution to Problem

In order to solve the above-descried problem, the present invention provides a thermal insulating sheet comprising a laminated member comprising a tarpaulin sheet, a plurality of synthetic resin nonwoven fabric sheets, and a polyester canvas, with the plurality of synthetic resin nonwoven fabric sheets being provided between the tarpaulin sheet and the polyester canvas, wherein a perimeter of the laminated member possesses at least a part where at least the tarpaulin sheet and the polyester canvas are fuse-bonded, and remaining parts where the laminated member is stitched together, and wherein the polyester canvas possesses one or more through holes, through which air can enter into and exit out of the laminated member, whereas the tarpaulin sheet does not possess any through holes.

Preferably, the polyester canvas of the laminated member is provided with a string-shaped member across the through hole, and a sheet strip covering the through hole over the string-shaped member.

The tarpaulin sheet and the nonwoven fabric sheet are preferably fixed to each other with hook-and-loop fasteners.

According to the present invention, a first sheet for use in a truck bed is formed of the thermal insulating sheet described above, and covers an upper surface of the bed of the truck with the tarpaulin sheet faced upward.

Preferably, the sheets for use in a truck bed comprise two sheets divided in a widthwise direction of the truck, and each of the divided sheets is configured to be mounted on a scattering prevention device mounted on an upper end of a side gate board of a bed side and configured to cover the upper surface of the bed in a retractable manner.

In this case, preferably, the divided sheets have hook-and-loop fasteners, and the divided sheets are configured to be fixed to pipe frames which constitute part of the scattering prevention device by the hook-and-loop fasteners.

A second sheet for use in a truck bed of the present invention is formed of the thermal insulating sheet described above, and is configured to be mounted on a side surface of the bed of the truck with the tarpaulin sheet faced outward of the bed.

Preferably, the sheet for use in a truck bed is provided with a magnet(s) attached on a surface of the polyester canvas.

According to the thermal insulating case of the present invention, the thermal insulating sheet described above is formed into a box shape having an opening, with the tarpaulin sheet faced outward.

The thermal insulating case described above preferably includes a temperature measuring/recording member configured to measure and record temperatures in an interior of the thermal insulating case.

The temperature measuring/recording member is further preferably configured to record the temperatures in an IC tag.

Advantageous Effects of Invention

The thermal insulating sheet of the present invention described above, having the laminated member comprising three types of sheets overlapped with each other, brings out a high thermal insulation ability and a waterproof property when covering an object with the polyester canvas side in contact with the object. With the through hole(s) formed through the polyester canvas, air accumulated in the laminated member is allowed to evacuate outward. Therefore, the air in the thermal insulating sheet is prevented from thermally expanding due to the high thermal insulation ability of the laminated member and thus the thermal insulating sheet is prevented from swelling up. Even when the thermal insulating sheet is swelled up, the air in the interior can be released quickly through the through hole(s) when folding the thermal insulating sheet or the like. Accordingly, the thermal insulating sheet described above has a significant easiness to handle relating to folding after the use of the thermal insulating sheet and the like.

In the case where the polyester canvas of the laminated member is provided with the string-shaped member across the through hole, and the sheet strip is provided over the string-shaped member to cover the through hole, entry of foreign substances such as the asphalt mixture, an object to be thermally insulated, rain water, dust and the like through the through hole into the interior of the thermal insulating sheet is prevented because the through hole is covered with the sheet strip. With the sheet strip over the string-shaped member covering the through hole, a gap is maintained between the surface of the polyester canvas having the through hole formed therethrough and the sheet strip, thereby making evacuation of air more likely to occur from the thermal insulating sheet via the through hole(s). Accordingly, a restriction of swelling of the thermal insulating sheet and an improvement of easiness to handle are effectively achieved.

In the case where the tarpaulin sheet and the nonwoven fabric sheet are fixed to each other by the hook-and-loop fasteners, an occurrence of sliding movement between the tarpaulin sheet and the nonwoven fabric sheet with respect to each other is prevented. In particular, in the case where the thermal insulating sheet is used for covering the bed of the truck, it is expected that a person gets on the thermal insulating sheet. In this manner, by preventing slippage between surfaces which constitute part of the thermal insulating sheet, workability and safety when the person, gets on the thermal insulating sheet are improved. From this point of view, the easiness to handle the thermal insulating sheet is enhanced.

Since the first sheet for use in a truck bed of the present invention described above is formed of the thermal insulating sheet described above, a high thermal insulation ability, a waterproof property, and easiness to handle are achieved. In particular, by applying the thermal insulating sheet described above to the sheet configured to cover the upper surface of the bed which occupies a large surface area and, in addition, radiates heat actively to the atmospheric air, the high thermal insulation ability of the thermal insulating sheet described above is effectively utilized. The thermal insulating sheet which covers the upper surface of the bed is exposed directly to solar radiation, and air in the interior of the thermal insulating sheet tends to expand. Therefore, with the provision of the through hole(s), being capable of restricting the expansion of the thermal insulating sheet and accelerating evacuation of air at the time of folding brings about a great effect.

In the case where the sheets for use in a truck bed comprise two sheets divided in the widthwise direction of the truck, and each of the divided sheets is configured to be mounted on a scattering prevention device mounted on an upper end of the side gate board of the bed and configured to cover the upper surface of the bed in a retractable manner, a state in which the thermal insulating sheet covers the upper surface of the bed is achieved only by bringing the scattering prevention device into a closed state. Also, the thermal insulating sheet can be removed from the upper surface of the bed only by bringing the scattering prevention device into an opened state. In addition, since the divided sheets may be kept mounted on the scattering prevention device, mounting and dismounting the divided sheets every time of use are not necessary. In this manner, easiness to handle the sheet for use in a truck bed is further enhanced.

In addition, in this case, with the configuration in which the divided sheets are provided with the hook-and-loop fasteners, and are configured to be fixed to the pipe frames which constitute part of the scattering prevention device by the hook-and-loop fasteners, mounting of the divided sheets on the scattering prevention device and dismounting of the divided sheets from the scattering prevention device can be performed easily.

Since the second sheet for use in a truck bed of the present invention described above is formed of the thermal insulating sheet described above, a high thermal insulation ability, a waterproof property, and easiness to handle are achieved. Heat radiation from a load via side surfaces of the bed cannot be ignored. By covering these portions with the thermal insulating sheet having a high thermal insulation ability described above, a thermal insulation ability with respect to the load can be effectively enhanced. The side surfaces of the bed have an elongated shape, and thus the sheet extending along these side surfaces naturally have the elongated shape. Therefore, there may be a case where handling may be difficult when folding the sheet. Accordingly, the through hole(s) is(are) formed to accelerate evacuation of air at the time of folding, and an increase in difficulty of handling due to the thermal expansion of the thermal insulating sheet is prevented.

In the case where a magnet(s) is(are) attached on the surface on the polyester canvas side, the sheet for use in a bed can be fixed to the side surface of the bed formed of iron-based material by the magnet(s). Accordingly, easiness to handle the sheet for use in a bed relating to the mounting and dismounting is further enhanced.

The thermal insulating case of the present invention described above, being formed of the thermal insulating sheet described above, has a high thermal insulation ability. By being formed into a box shape having an opening, the object to be thermally insulated can be covered with a simple operation and be kept warm.

In the case where the thermal insulating case includes the temperature measuring/recording member configured to measure and record the temperature in the interior of the thermal insulating case, the temperature of the object to be thermally insulated can be controlled when storing and transporting the object to be thermally insulated.

In the case where the temperature measuring/recording member is configured to record the temperature in the IC tag, the temperature information can be read out in a non-contact manner, and thus temperature control is easily achieved. Since the object to be thermally insulated does not have to be exposed by opening part of the thermal insulating case when reading the temperature information, thermal insulation efficiency can be kept high.

BRIEF DESCRIPTION OF DRAWINGS

FIG. 1 illustrates a laminated structure of a thermal insulating sheet according to an embodiment of the present invention, in which

FIG. 3 illustrates plan views of a surface of the thermal insulating sheet described above on a polyester canvas side illustrating a configuration of slits, in which

FIG. 4 illustrates a bonding structure between a nonwoven fabric layer and a tarpaulin sheet of the thermal insulating sheet described above, in which

FIG. 10 illustrates a configuration of a thermal insulating case according to an embodiment of the present invention, in which

DETAIL DESCRIPTION OF INVENTION

A thermal insulating sheet, a sheet for use in a truck bed and a thermal insulating case of an embodiment of the present invention will be described with reference to the drawings in detail below. In this specification, "thermal insulation" includes not only to keep an object to temperatures higher than an ambient temperature, but also to keep the object to temperatures lower than the ambient temperature, which is referred to as "cold insulation".

<Thermal Insulating Sheet>

A configuration of the thermal insulating sheet according to the embodiment of the present invention will be illustrated in FIGS. 1 to 4.

(Laminated Structure)

Figure 1A:
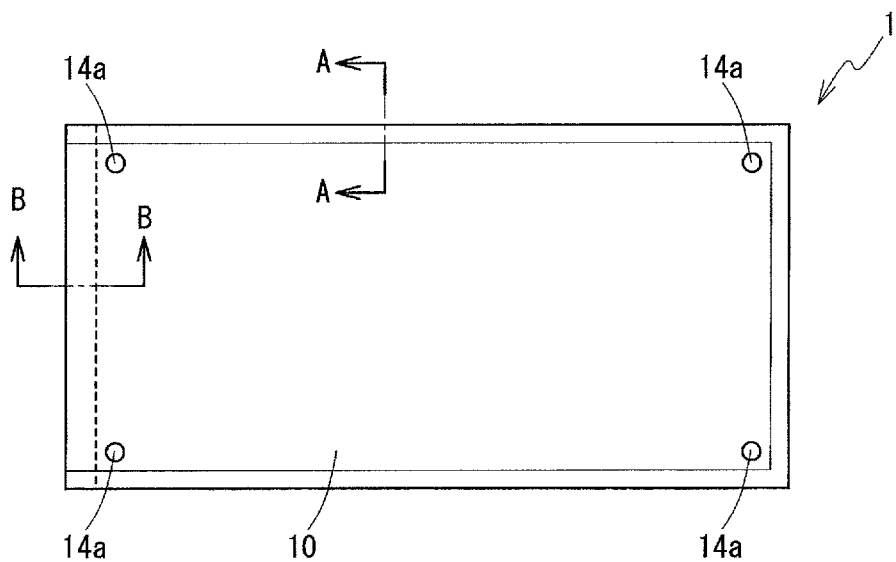
FIG. 1A is a plan view.
Figure 1B:
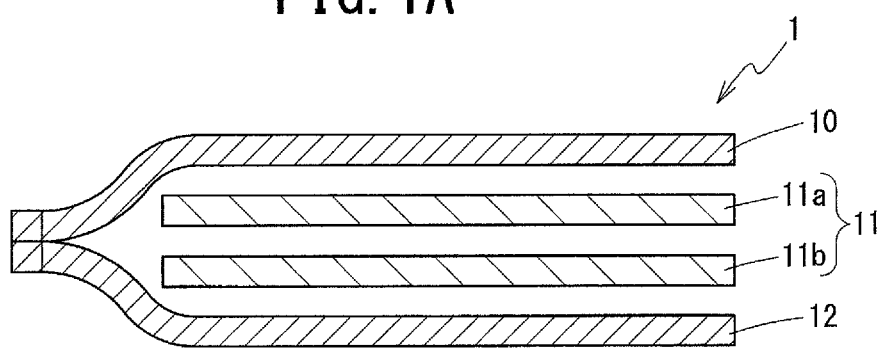
FIG. 1B is a cross-sectional view taken along line A-A and FIG. 1C is a cross-sectional view taken along line B-B.
Figure 1C:
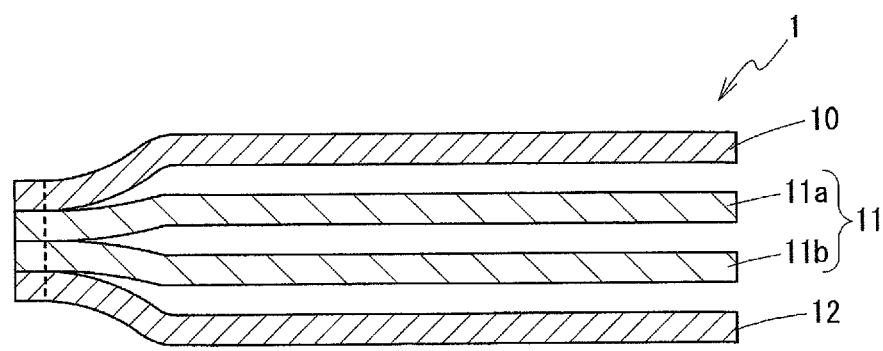
Figure 2:
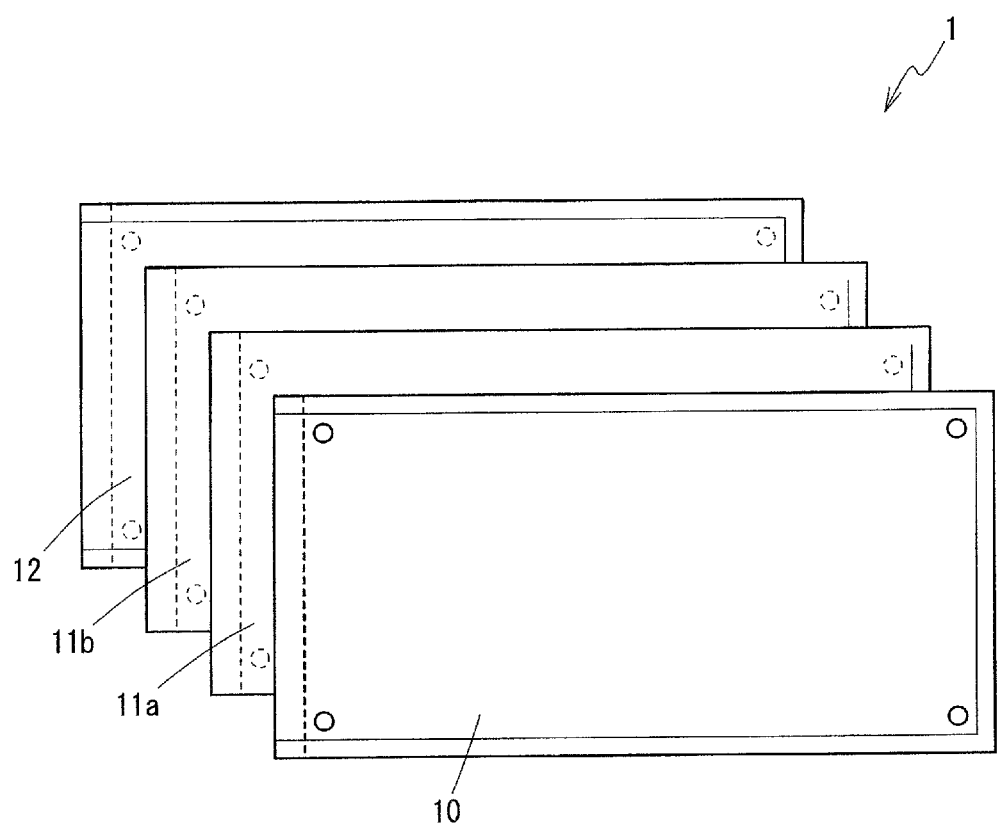
FIG. 2 is an exploded plan view illustrating the laminated structure of the thermal insulating sheet described above.

A thermal insulating sheet 1 according to the embodiment of the present invention is formed mainly of a laminated member comprising a tarpaulin sheet 10, a nonwoven fabric layer 11, and a polyester canvas 12, with the plurality of synthetic resin nonwoven fabric sheets being provided between the tarpaulin sheet and the polyester canvas as illustrated in FIGS. 1 and 2. When using the thermal insulating sheet 1, a polyester canvas 12 side is faced toward an object that thermal insulation is wanted (inside), and the tarpaulin sheet 10 side is faced toward an external environment such as atmospheric air (outside).

The tarpaulin sheet 10 is formed by placing a sheet formed of resin fiber such as polyester between films formed of thermoplastic resin having a high waterproof property such as vinyl chloride, and is very tough and superior in a heat shielding property and a water-resistant property. The thickness of the tarpaulin sheet 10 is preferably 0.25 mm or larger in order to ensure a sufficient strength and heat shielding property, and a water-resistant property. In order to enhance the thermal insulation ability of the thermal insulating sheet 1 and provide a weather resistant property, the tarpaulin sheet 10 is preferably provided with metallic component on a surface thereof by lamination such as the one called Silver tarpaulin, for example. The surface of the tarpaulin sheet 10 has an easy-to-print property, and thus a company name, a logo, and the like may be printed on an outside surface thereof as needed.

The nonwoven fabric layer 11 is formed by laminating a plurality of layers of synthetic resin nonwoven fabric sheets. In the example illustrated in FIGS. 1 and 2, the nonwoven fabric layer 11 comprises two nonwoven fabric sheets 11a, 11b. The nonwoven fabric is superior in a thermal insulation ability by retaining air in a structure. By laminating the plurality of layers, air layers are formed between the layers and thus the high thermal insulation ability is exerted. The nonwoven fabric sheets 11a, 11b may be a nonwoven fabric formed of any synthetic resin. However, a polyester nonwoven fabric superior in the thermal insulation ability, having a heat resistant property, having a low water-absorbing property, and being light weight is preferable. From the point of having a high strength, a spunbonded nonwoven fabric is preferable. The number of layers of the nonwoven fabric sheet may be selected as needed within a range in which a desired thermal insulation ability is obtained and that the thickness does not hinder the easiness to handle of the thermal insulating sheet 1. As described later, when using the thermal insulating sheet 1 for transporting an asphalt mixture, a sufficient thermal insulation ability is achieved by using two nonwoven fabric sheets as in an example illustrated in FIGS. 1 and 2. However, when usage in cold area is supposed, four nonwoven fabric sheets, for example, may be used. The nonwoven fabric sheets 11a, 11b may be simply fixed with each other together with the tarpaulin sheet 10 and the polyester canvas 12 at a perimeter, or may be fixed to each other separately by stitching or the like. Preferably, in order to prevent displacement between the nonwoven fabric sheets 11a, 11b, mutual fixation at a portion in addition to the perimeter is preferable.

The polyester canvas 12 is formed by applying surface treatment by coating or impregnating a thick plain-woven polyester cloth with a waterproof resin such as vinyl chloride. The polyester canvas is generally used as a hood of the truck or a sheet for protecting a load, has a water-resistant property, although not as much as that of the tarpaulin sheet 10, and also has an oil-resistant property, a chemical resistant property, and an abrasion resistant property. The thickness of the polyester canvas 12 is preferably at least 0.4 mm in terms of achievement of a water-resistant property, an oil-resistant property and a strength and is preferably not larger than 1.0 mm in terms of easiness to handle of the entire thermal insulating sheet 1.

In this thermal insulating sheet 1, since the nonwoven fabric sheets 11a, 11b retain the air layer and are interposed between the tarpaulin sheet 10 and the polyester canvas 12 which are not likely to allow air to pass therethrough, a high heat-shielding effect and a high thermal insulation ability are achieved. The thermal insulation ability is further enhanced and a higher waterproof property is achieved by the tarpaulin sheet 10 which is arranged on an outside surface of the object to be thermally insulated. Since the polyester canvas 12 superior in a water-resistant property, an oil-resistant property, a chemical resistant property, and an abrasion resistant property is arranged on an inside surface thereof which comes into contact with the object to be thermally insulated, even though various types of objects to be thermally insulated are covered, the thermal insulating sheet 1 is less likely to be damaged or contaminated. For example, the thermal insulating sheet 1 can be used desirably even when covering an oil-based material such as the asphalt mixture. Even though the surface of the polyester canvas 12 is contaminated by the oil-based material or the like, the contamination can be removed easily only by wiping off or the like with adequate medical agents because the surface treatment is applied thereto.

At least part of a perimeter of a laminated structure formed of the tarpaulin sheet 10, the nonwoven fabric layer 11, and the polyester canvas 12 is fuse-bonded by thermal fusion bonding. Since air in the interior of the thermal insulating sheet 1 cannot be evacuated from the fuse-bonded perimeter, fusion bonding contributes to an enhancement of the thermal insulation ability of the thermal insulating sheet 1. At the time of fusion bonding, all of the tarpaulin sheet 10, the nonwoven fabric layer 11, and the polyester canvas 12 may be fuse-bonded integrally, or only the tarpaulin sheet 10 and the polyester canvas 12 may be fuse-bonded. If the nonwoven fabric 11 is not fuse-bonded together and only the tarpaulin sheet 10 and the polyester canvas 12 are fuse-bonded, a free flow of air between sheet layers is secured, and a uniform air layer may be formed entirely in the thermal insulating sheet 1. In this sense, at least part of a fusion-bonded portion at the perimeter of the thermal insulating sheet 1, a portion where only the tarpaulin sheet 10 and the polyester canvas 12 are fuse-bonded is preferably provided.

In portions of the perimeter of the laminated structure which are not fuse-bonded, the tarpaulin sheet 10, the nonwoven fabric layer 11, and the polyester canvas 12 are stitched together by being stitched with a sewing machine or the like. A stitched portion functions as a port of evacuation air, and restricts thermally expanded air from staying in the interior of the thermal insulating sheet 1. When stitching together, the tag or the like in which a product number or the like is marked can be stitched simultaneously together, so that product control can be easily performed.

In the example illustrated in FIGS. 1 and 2, the tarpaulin sheet 10, the nonwoven fabric layer 11, and the polyester canvas 12 are formed in a rectangular shape, and the lengths on the long sides are substantially the same. However, only the length of the nonwoven fabric layer 11 on the short side is short. The edges along two opposed long sides of the tarpaulin sheet 10 and the polyester canvas 12 are thermally fuse-bonded as illustrated in FIG. 1B. In contrast, the tarpaulin sheet 10, the two nonwoven fabric sheets 11a, 11b, and the polyester canvas 12 are stitched together at the edge along one of the short sides illustrated in FIG. 1C. The tarpaulin sheet 10, the two nonwoven fabric sheets 11a, 11b, and the polyester canvas 12 are fuse-bonded at the edge along the other of the short sides. In the drawing, the fuse-bonded portions are illustrated by thin solid lines and the stitched portions are illustrated by broken lines.

In this manner, by fuse-bonding at least part of the perimeter, the air can be trapped in the interior of the thermal insulating sheet 1, so that a high thermal insulation ability can be obtained. In contrast, by stitching part of the perimeter, an adequate air releasing path is secured, and hence the thermal insulating sheet 1 is prevented from expanding. A ratio between the fuse-bonded portion and the stitched portion may be determined as needed by considering required thermal insulation ability and necessity of prevention of expansion of the thermal insulating sheet 1. As described later, slits 13 are additionally formed in the polyester canvas 12 in order to secure the port for evacuation of air in the thermal insulating sheet 1. Therefore, if the prevention of expansion is sufficiently achieved by the slits 13, the perimeter may be fuse-bonded entirely. In contrast, in the example illustrated in FIGS. 1 and 2, only one of the opposed short sides is stitched together. However, the number of the stitched portions may be increased by stitching both short sides.

The entire thickness of the thermal insulating sheet 1 formed in this manner is typically 1 to 2 mm. When using two nonwoven fabric sheets, the entire thickness of the thermal insulating sheet 1 is close to 1 mm, and when using four nonwoven fabric sheets, the thickness becomes close to 2 mm.

A fixing structure such as a grommet hole is formed as needed in the thermal insulating sheet 1. In FIGS. 1 and 2, after the fusion-bonding and the stitching of the perimeter have been completed, grommet holes 14a are formed in the vicinities of corners of the rectangle.

(Configuration of Slits)

Figure 3A:
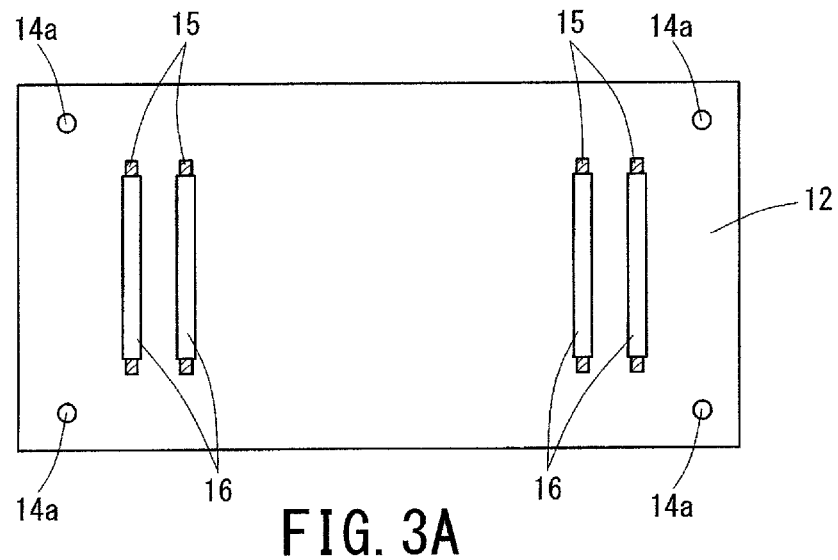
FIG. 3A illustrates a state in which a rope and a cover are mounted.
Figure 3B:
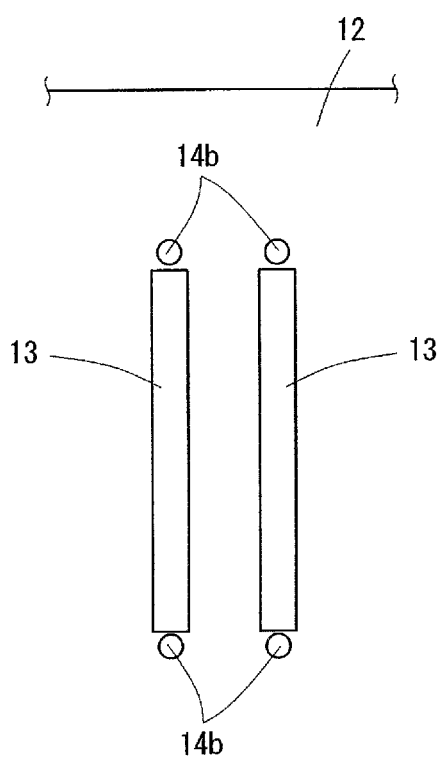
FIG. 3B illustrates a state without the rope and the cover.

In the thermal insulating sheet 1, the slits 13 are formed as through holes through the polyester canvas 12 for degassing as illustrated in FIG. 3B. Ropes string-shaped member) 15 are extended between the two grommet holes 14b, 14b provided so as to oppose each other outside the slits 13 in a longitudinal direction on an outside surface of the polyester canvas 12 (the surface opposite to the surface which comes into contact with the nonwoven fabric layer 11). Cover sheets (sheet strips) 16 are arranged so as to cover the slits 13 over the ropes. The cover sheets 16 are stitched together with the polyester canvas 12 in a state in which the perimeter thereof are opened at least partly.

As described above, in the thermal insulating sheet 1, the nonwoven fabric layer 11 comprising a plurality of nonwoven fabric sheets is interposed between the tarpaulin sheet 10 and the polyester canvas 12 which are fuse-bonded at least partly along the perimeter thereof to retain the air layer. Due to air leakage efficiency, if there is no slit 13 provided therein, if the thermal insulating sheet 1 is exposed to heat from an object to be thermally insulated which is covered or from insolation, the air layer retained in the thermal insulating sheet 1 is heated and thus is expanded, and the entire thermal insulating sheet 1 is swelled up like a balloon. For example, if expansion of the thermal insulating sheet 1 occurs in the case where the thermal insulating sheet 1 is installed on a bed of the truck, a surface area that receives wind during travel of the truck is increased, so that the thermal insulating sheet 1 is more likely to be blown off, or handling of the sheet during folding or the like after the usage may become difficult. With the slits 13 formed therein, thermally expanded air may be evacuated out of the thermal insulating sheet 1 via the slits 13, and thus such an expansion of the thermal insulating sheet 1 can be reduced. Even though the thermal insulating sheet 1 happens to be expanded during the usage, the inside air can be evacuated from the slits 13 by applying a force of compressing the thermal insulating sheet 1 in the thickness direction during folding work or the like, so that the expansion of the sheet can be cancelled easily. Prevention of expansion and acceleration of evacuation of air as described above are performed also by the stitched portion formed along the perimeter of the thermal insulating sheet 1. However, voids formed in the stitched portion by lines of perforation and the like are small, and thus the functions described above cannot be sufficiently achieved. By forming the slits 13, prevention of expansion and evacuation of air can be sufficiently achieved.

A size and a shape of the slits 13 and the position and the density thereof on the thermal insulating sheet 1 may be determined as needed so that air is sufficiently evacuated and a required thermal insulation ability is secured. In FIG. 3A, the slits 13 is arranged in the vicinity of an end portion of the thermal insulating sheet 1 in the longitudinal direction, so that the thermal insulation ability is less likely to be hindered when the thermal insulating sheet 1 is used by being spread, and air in the interior can be released easily when being folded.

Although the cover sheets 16 that cover the slits 13 do not have to be provided necessarily, with the presence of the cover sheets 16, foreign substances such as rain water, dust, an object to be thermally insulated like asphalt mixture and the like are prevented from entering the interior of the thermal insulating sheet 1 from the slits 13. With the ropes 15 interposed between the cover sheets 16 and the slits 13, gaps are formed between the slits 13 and the cover sheets 16, and evacuation of air via the slits 13 can be carried out smoothly even though the cover sheets 16 are present.

The cover sheets 16 are preferably formed of a polyester canvas having a water-resistant property, an oil-resistant property, and the like. Examples of the material of the ropes 15 include a cotton rope from the viewpoint such as being superior in flexibility and strength. The thickness of the rope 15 may be selected so as to form a sufficient void between the cover sheet 16 and the slit 13. Positions of fixation of the cover sheets 16 to the polyester canvas 12 may be selected as needed so that an air passage is sufficiently secured and prevention of entry of foreign substances is effectively exercised. For example, a configuration in which only the short sides of the cover sheet 16 having a rectangular shape are fixed to the polyester canvas 12 and the long sides are opened, or a configuration in which three sides are fixed to the polyester canvas 12 and one side is opened may be exemplified.

(Fixation of Nonwoven Fabric Layer and Tarpaulin Sheet)

Figure 4A:
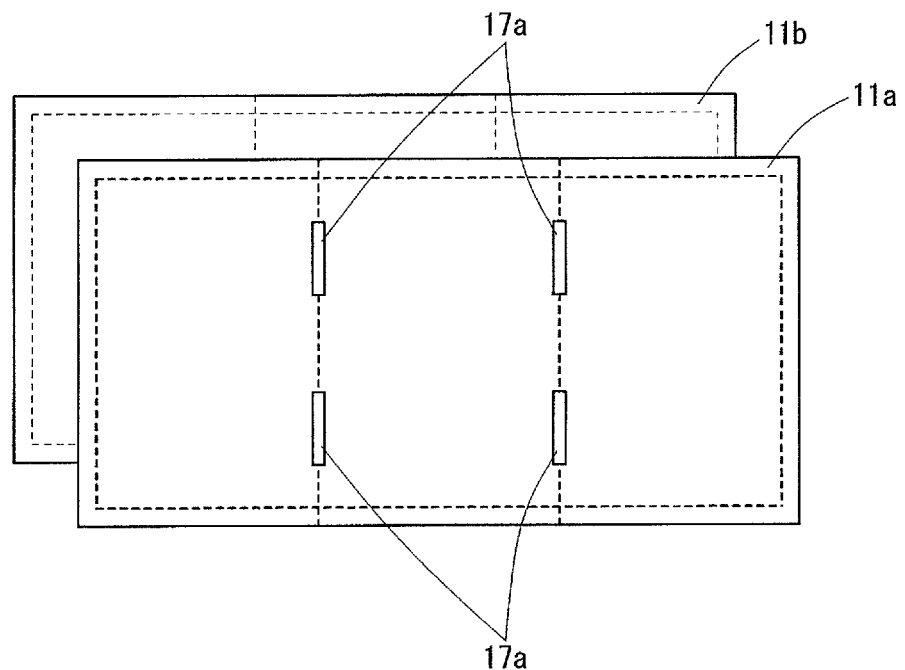
FIG. 4A is an exploded plan view illustrating the nonwoven fabric layer.
Figure 4B:
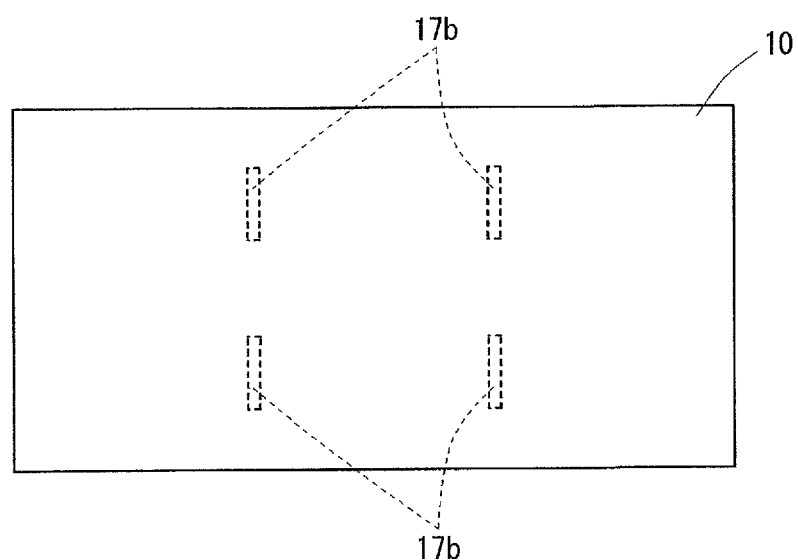
FIG. 4B is a plan view illustrating the tarpaulin sheet.

In the thermal insulating sheet 1 the nonwoven fabric layer 11 and the tarpaulin sheet 10 are fixed to each other with fixing means in order to prevent displacement from each other in an in-plane direction. FIG. 4 illustrates a structure between the nonwoven fabric layer 11 and the tarpaulin sheet 10. The two nonwoven fabric sheets 11a, 11b are stitched with each other as illustrated in broken lines in FIG. 4A. One of hook-and-loop fasteners (for example, Magic Tape (registered trademark)) 17a is stitched to a surface of the nonwoven fabric sheet 11a on the tarpaulin sheet 10 side. The other one 17b of hook-and-loop fasteners is stitched to a position opposing the hook-and-loop fastener 17a fixed to the nonwoven fabric sheet 11a on the surface of the tarpaulin sheet 10 of the nonwoven fabric layer 11 side. As illustrated in FIGS. 1 and 2, in a state in which the tarpaulin sheet 10 and the nonwoven fabric layer 11 overlap with each other, the hook-and-loop fastener 17a formed on the nonwoven fabric layer 11 and the hook-and-loop fastener 17b formed on the tarpaulin sheet 10 engage, and the nonwoven fabric layer 11 and the tarpaulin sheet 10 are fixed to each other in an in-plane direction.

A combination of the nonwoven fabric and the tarpaulin material tends to cause slippage with respect to each other in the in-plane direction. If the tarpaulin sheet 10 and the nonwoven fabric layer 11 are not fixed to each other, slippage may occur between these layers when a person walks on the thermal insulating sheet 1. A state in which the person walks on the thermal insulating sheet 1 is supposed to occur when the thermal insulating sheet 1 is installed on the bed of the truck and a worker works on the bed. If the tarpaulin sheet 10 and the nonwoven fabric layer 11 are fixed to each other in the in-plane direction, such slippage may be reduced, and workability and safety when the person walks on the thermal insulating sheet 1 can be enhanced.

The number and arrangement of the hook-and-loop fasteners may be determined so that the displacement between the tarpaulin sheet 10 and the nonwoven fabric layer 11 can be sufficiently prevented. As illustrated in FIG. 4A, providing hook-and-loop fasteners 17a, 17b at four positions at central symmetry on an inner side in the plane of the thermal insulating sheet 1 is preferable from this point of view. The fixing means that fixes the tarpaulin sheet 10 and the nonwoven fabric is not limited to the hook-and-loop fasteners. However, the hook-and-loop fasteners are preferable in terms of strong retention force against displacement in the in-plane direction even though the surface area is small, and easiness of attaching. Only a few stitches for attaching the hook-and-loop fasteners are exposed on an outside surface of the tarpaulin sheet 10 (the surface opposite side to the nonwoven fabric layer 11) which is a design surface. This configuration is preferable because printing of company name or logo can be printed without being hindered thereby. For example, although the function to fix the both is achieved only by stitching the tarpaulin sheet 10 and the nonwoven fabric layer 11 together with each other by stitching with the sewing machine or the like at a position inward in the in-plane direction. However, air tends to be accumulated and be expanded easily in an area surrounded by the stitches, and in addition, a lot of stitches are exposed on the outer surface of the tarpaulin sheet 10.

(Application of Thermal Insulating Sheet)

The thermal insulating sheet 1 of the present invention is a light-weight sheet having a high thermal insulation ability and a water-resistant property as described above, and comprises the nonwoven fabric as a principal member having a thermal insulation ability. Therefore, the thermal insulating sheet 1 may be used for thermally insulating various types of articles. By covering the object to be thermally insulated with the thermal insulating sheet 1 of the present invention with the surface on the polyester canvas 12 side facing inside and coming into contact with the object to be thermally insulated and the surface on the tarpaulin sheet 10 side facing outside and coming into contact with the atmospheric air or the like, heat radiation from the object to be thermally insulated at a temperature higher than that of the atmospheric air to the atmospheric air or the like and heating of the object to be thermally insulated in a state of having a temperature lower than the atmospheric air are effectively restricted.

Among others, the thermal insulating sheet 1 of the present invention can be used preferably for an asphalt mixture. The asphalt mixture is heated to a predetermined temperature in a manufacturing step in the plant or the like and transported to a building site such as a construction site. When applying the asphalt mixture, the temperature is a very important parameter, and when the temperature of the asphalt mixture is lowered, a block of cooled asphalt is generated, and application thereof becomes significantly difficult. Accordingly, finish of an applied portion is also deteriorated. Accordingly a temperature decrease of the asphalt mixture can be restricted by transporting the asphalt mixture in a state of being covered with the thermal insulating sheet 1 of the present invention, and thus the asphalt mixture can be used for application in a desired temperature condition without necessity of heating the asphalt mixture excessively in the manufacturing site or reheating the asphalt mixture in the building site. Accordingly, the application can be achieved easily and the finish is improved. Being capable of omitting excessive heating and reheating contributes not only to reduce time and cost required for the application, but also to reduce consumption of energy and exhaustion of carbon dioxide, and to protect global environment. The asphalt mixture is transported in a heated state, and expansion of the thermal insulating sheet by the heat cannot be ignored. Therefore, the configuration of the thermal insulating sheet 1 of the present invention provided with the slits 13 for degassing is effective in application to the asphalt mixture.

The thermal insulating sheet 1 of the present invention has the configuration in which the nonwoven fabric layer 11 comprising the plurality of layers is interposed between the tarpaulin sheet 10 and the polyester canvas 12, and thus a high thermal insulation ability is achieved both in an area having a higher temperature than ordinary temperatures and in an area having a temperature lower than the ordinary temperatures. Accordingly, the thermal insulating sheet of the present invention can be used desirably not only to an application of retaining the temperature of objects heated to temperatures higher than the ambient temperature such as the asphalt mixture, but also to an application of retaining the temperature of objects cooled to the temperatures lower than the ambient temperature. For example, various types of medical agents and food and drink are required to be retained at low temperatures at the time of storage or transportation in many cases for maintaining the quality, and the thermal insulating sheet 1 of the present invention is preferably used for covering these materials.

<Sheet for Use in a Truck Bed>

The sheet for use in a truck bed according to an embodiment of the present invention (may be referred to simply as a sheet for use in a bed or a sheet) is formed of the thermal insulating sheet 1 of the embodiment of the present invention described above, and is configured to cover a load such as the asphalt mixture put on the bed of a truck (specifically, flat body trucks, dump trucks, and the like). According to the shape of the bed of the truck and the shape of the load or the like, the sheet for use in a truck bed can be formed into a desired shape. However, the embodiment described below may be exemplified as a desired shape.

The beds of the flat body truck and the dump truck are exposed to the atmospheric air and are difficult to maintain the temperature of the load. However, by configuring a sheet for covering the load by using the thermal insulating sheet 1 described above, a high thermal insulation ability is obtained. In addition, since the bed is exposed directly to solar radiation, air accumulated in the thermal insulating sheet is likely to expand. However, by using the sheet for use in a bed formed of the thermal insulating sheet 1 described above, since the slits 13 are formed, prevention of expansion and acceleration of evacuation of air are achieved, so that significant easiness to handle is achieved at the time of folding the thermal insulating sheet 1.

First Embodiment

Figure 5:
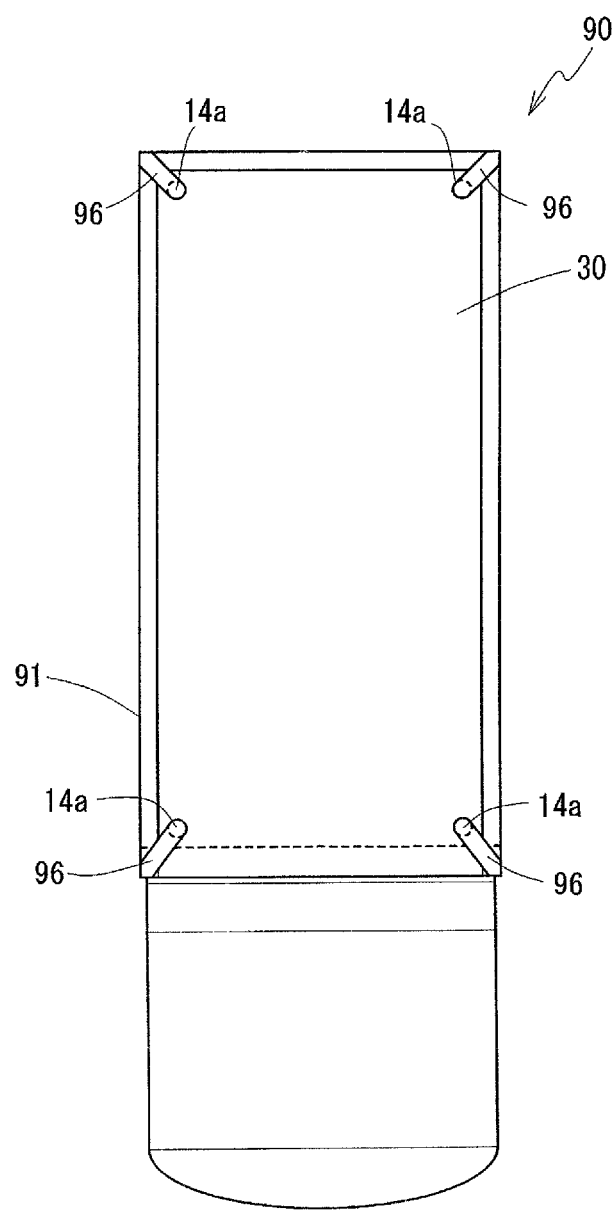
FIG. 5 is a top view illustrating a state of mounting a sheet for use in a truck bed of a first embodiment of the present invention on a truck.

FIG. 5 is a top view schematically illustrating a state of mounting a sheet 30 for use in a truck bed of a first embodiment of the present invention on a bed 91 of a truck 90. A sheet 30 for use in a bed is formed of the single rectangular thermal insulating sheet 1, and covers the substantially entire area of an upper surface of the bed 91 of the truck 90. With ropes 96 inserted through grommet holes 14a provided at four corners in a state of covering the load with the sheet 30 for use in a bed with a surface on the tarpaulin sheet 10 side face upward and fixed to the bed 91, the sheet 30 for use in a bed can be mounted on the bed 91.

Since the sheet 30 for use in a bed of the present embodiment has a simple configuration such that the entire part is composed of the single thermal insulating sheet 1, a high thermal insulation ability is achieved. Specifically, the sheet 30 for use in a bed of the present embodiment can be used desirably in the case where a surface area of the bed 91 is small and the sheet 30 for use in a bed can be mounted on and dismounted from the bed 91 relatively easily. In FIG. 5, it seems that the sheet 30 for use in a bed having the substantially same surface area as that of the bed 91 is extended over the bed 91 so as to clearly show the portion of installation of the sheet 30 for use in a bed. Actually, however, covering the load with the sheet 30 having a sufficient surface area with respect to the surface area of the bed 91 in a floaty manner brings about higher thermal insulation effect.

Second Embodiment

Figure 6:
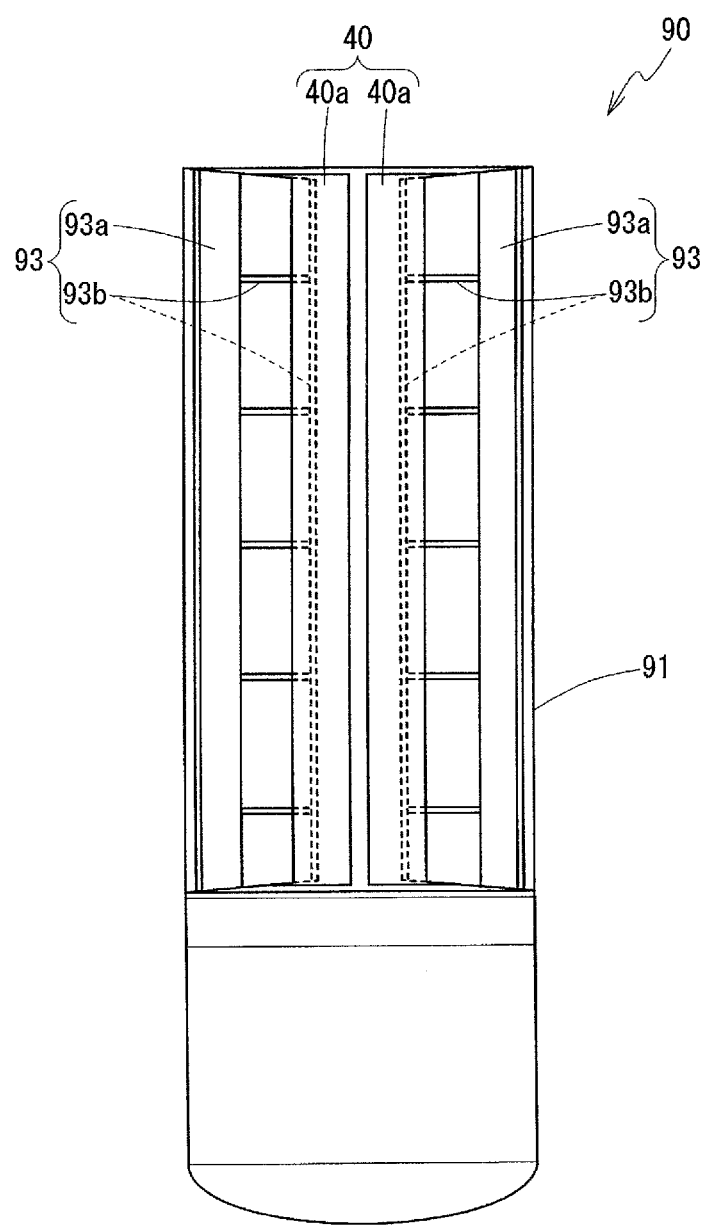
FIG. 6 is a top view illustrating a state of mounting a sheet for use in a truck bed according to a second embodiment of the present invention to a truck.
Figure 7:
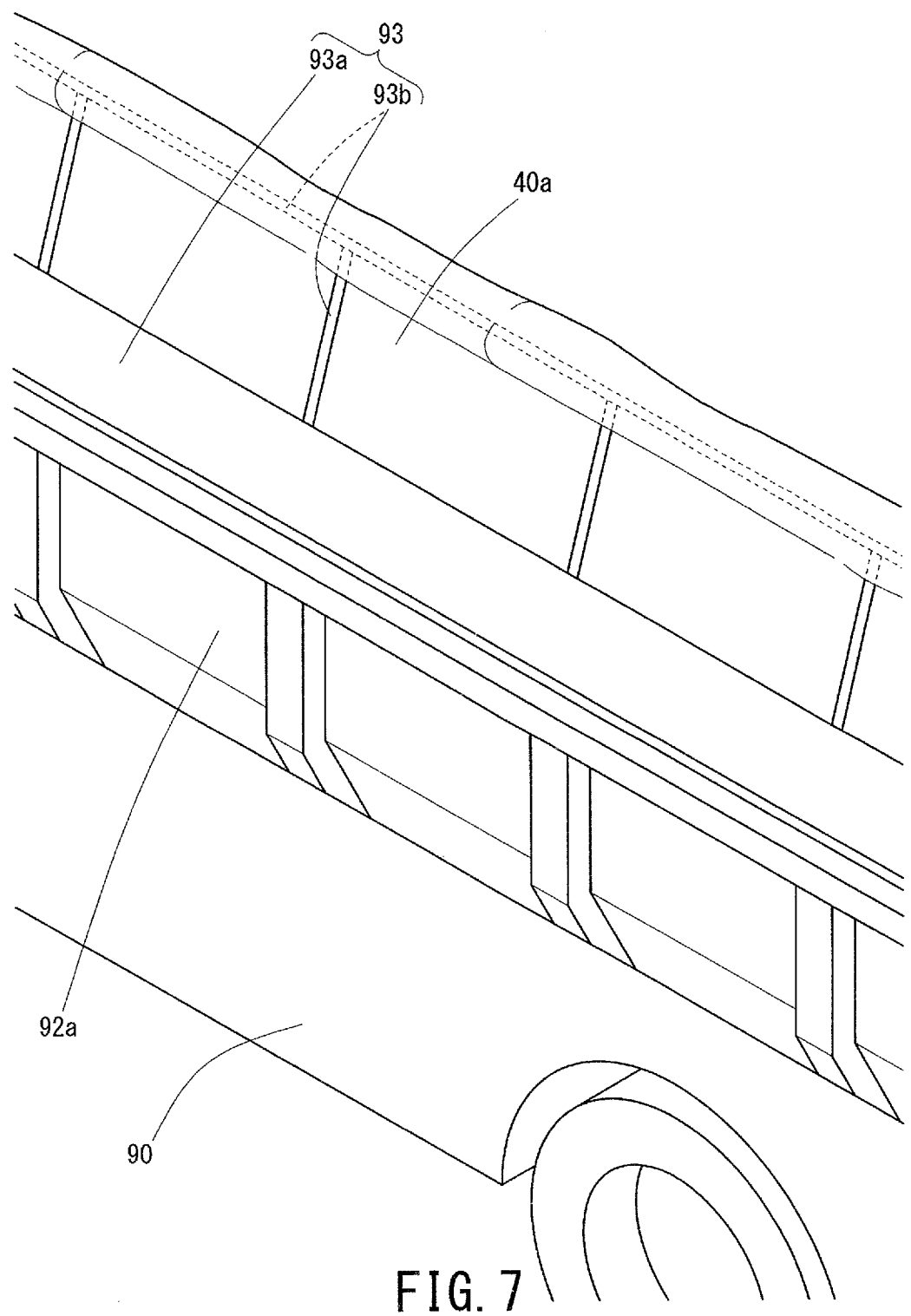
FIG. 7 is a perspective view illustrating the state of mounting a sheet for use in a truck bed according to the second embodiment described above to a truck.

FIGS. 6 and 7 illustrate a configuration of sheets 40 for use in a truck bed according to a second embodiment of the present invention. The sheets 40 for use in a bed of the present invention comprise two divided sheets 40a, 40a, which cover two halves of the upper surface of the bed 91 of the truck 90 divided in a widthwise direction of the truck 90. The sheets 40 for use in a bed of the present invention are mounted on the truck 90 having scattering prevention devices 93 that is retractable by a manual operation or an automatic operation. The scattering prevention devices 93 are often provided on a large-sized dump truck, and are provided above side gate boards 92a which form left and right side surfaces of the box-shaped bed 91, and function to prevent from scatter of the load by covering over the bed 91 in the closed state. The scattering prevention devices 93 each comprise a plate-shaped portion 93a, a pipe frame 93b formed of an iron frame, or both. The pipe frame 93b is often provided with a sheet member in order to enhance the scattering prevention effect.

The two divided sheets 40a, 40a are fixed to the pipe frames 93b of the left and right scattering prevention devices 93 of a vehicle body, respectively, so as to cover the surfaces that are formed by the pipe frames 93b. The divided sheets 40a, 40a are mounted inside the pipe frames 93b (the surfaces facing the bed 91) so that the surface on the tarpaulin sheet 10 side faces upward and the surface on the polyester canvas 12 side faces toward the bed 91 when the scattering prevention devices 93 is in the closed state. In the example illustrated in FIGS. 6 and 7, the divided sheets 40a, 40a are folded partly outward at upper end portions of the pipe frames 93b. When the scattering prevention devices 93 are brought into a closed state, as illustrated in FIG. 6, the two divided sheets 40a, 40a cover the left and right sides of the upper surface of the bed 91 respectively as the pipe frames 93b are arranged on the upper surface of the bed 91, so that the entire upper surface of the bed 91 is covered by the two sheets together. In contrast, as illustrated in FIG. 7, when the scattering prevention devices 93 are brought into the opened state, which is a state in which the scattering prevention devices 93 are raised upward, the two divided sheets 40a, 40a are removed from above the bed 91, and the bed 91 (and the load) is exposed.

Mounting of the divided sheets 40a, 40a onto the pipe frames 93b is achieved easily by using the hook-and-loop fasteners. For example, band-shaped mounting members provided with a hook-and-loop fastener may be arranged at portions which come into contact with the iron frames which constitute the pipe frames 93b on surfaces of the divided sheets 40a, 40a on the tarpaulin sheet 10 side. The mounting members are formed by attaching the hook-and-loop fasteners at both ends of the band-shaped sheets respectively, and being stitched to the divided sheets 40a, 40a at mid portions in the longitudinal direction. The divided sheets 40a, 40a then are arranged outside the pipe frames 93b of the scattering prevention devices 93, then band-shaped portions of the mounting portions are wound around the iron frames of the pipe frames 93b and the hook-and-loop fasteners at both ends of the band-shaped portions are engaged with each other.

In this manner, the sheets 40 for use in a bed that covers the upper portion of the bed 91 comprise the divided sheets 40a, 40a, and the divided sheets 40a, 40b are mounted on the scattering prevention devices 93, so that arrangement of the sheets 40 for use in a bed above the bed 91 and an operation for removing the same from above the bed 91 are achieved only by opening and closing the scattering prevention devices 93. Since the divided sheets 40a, 40a can be left mounted on the scattering prevention devices 93 even when the sheets 40 for use in a bed of the present invention are not used, mounting and dismounting of the divided sheets 40a, 40a do not have to be performed at loading and unloading the load to be thermally insulated every time. In addition, by mounting the divided sheets 40a, 40a on the pipe frames 93b of the scattering prevention devices 93 by using the hook-and-loop fasteners, mounting and dismounting can be easily performed even when mounting and dismounting of the divided sheets 40a, 40a are necessary.

In FIG. 6, a gap is provided between the two divided sheets 40a, 40a for the sake of easy understanding. Actually, however, the two divided sheets 40a, 40a are preferably provided so as to overlap each other near the center in the widthwise direction of the vehicle when the scattering prevention devices 93 is in the closed state in order to enhance the thermal insulation ability. In addition, a fixed member such as the hook-and-loop fasteners for fixing the two divided sheets 40a, 40a each other are preferably provided at the overlapped portion. In the same manner as the case of the first embodiment described above, the divided sheets 40a, 40a having enough surface area with respect to the surface area of the bed 91 are preferably mounted on the scattering prevention devices 93 in a floaty manner.

As described above, the two divided sheets 40a may be in a mode of being mounted outside (side not facing the bed 91) the pipe frames 93b in addition to a mode of being mounted inside the pipe frames 93b. In this case, the hook-and-loop fasteners for fixing the divided sheets to the pipe frames 93b may be mounted on the surfaces on the polyester canvas 12 side.

Third Embodiment

In the bed 91 of the truck 90, heat radiation from the side surfaces cannot be ignored in addition to heat radiation from the upper surface to the atmospheric air. Therefore, a sheet 50 for use in a truck bed of the third embodiment of the present invention is configured to be provided on a wall surface which constitutes the side surfaces of the bed 91 of the truck 90. Here, the side surfaces of the bed 91 are not limited to side wall surfaces 92a, 92a on both left and right sides, but include a rear wall surface 92b on a rear side of the vehicle, and a front wall surface 92c on a front side of the vehicle. The side wall surfaces 92a, 92a and the rear wall surface 92b may be a retractable gate board.

Figure 8:
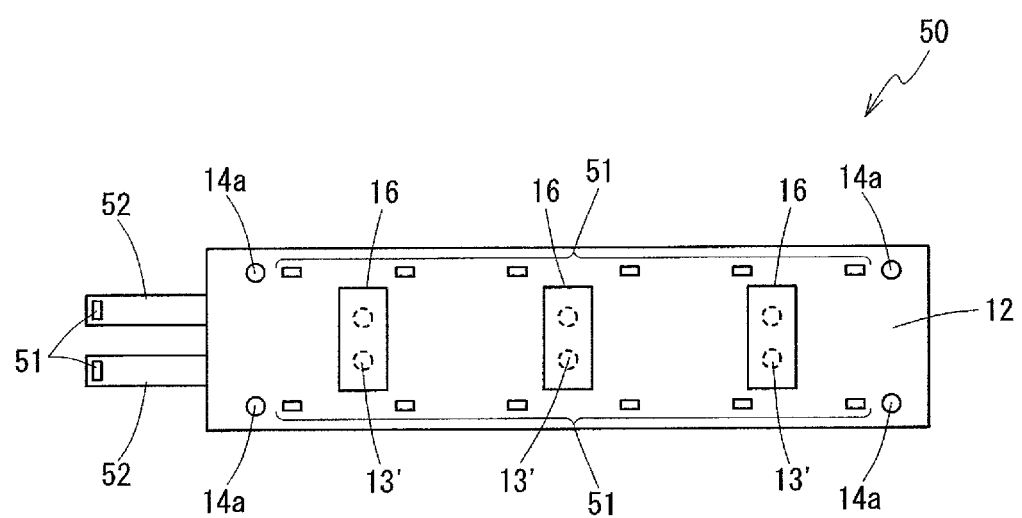
FIG. 8 is a plan view of a sheet for use in a truck bed according to a third embodiment of the present invention viewed from a polyester canvas side.

FIG. 8 illustrates a configuration of the sheet 50 for use in a truck bed. A sheet 50 for use in a bed comprises the rectangular thermal insulating sheet 1 which has the substantially same surface as one of outside surfaces of the side wall surfaces 92a, 92a, the rear wall surface 92b, and the front wall surface 92c of the bed 91 of the truck 90. A plurality of magnets 51 are fixed on the surface on the polyester canvas 12 side. Band-shaped auxiliary fixing members 52 extend from the short side of the thermal insulating sheet 1. The magnets 51 are attached to distal end portions of the auxiliary fixing members 52 as well. In this example, instead of the slits 13, substantially circular through holes 13' are formed through the polyester canvas 12 of the thermal insulating sheet 1, and are covered with the cover sheets 16.

The sheet 50 for use in a bed is mounted outside the bed 91 so as to extend along the side wall surfaces 92a, 92a, the rear wall surface 92b, and the front wall surface 92c of the bed 91. At this time, the surface on the polyester canvas 12 side faces inside the bed 91, that is, to the side which comes into contact with the side surfaces 92a, 92a, 92b, 92c of the bed 91. The surface on the tarpaulin sheet 10 side faces outside the bed 91. The side surfaces of the bed 91 of the truck 90 are formed of an ion-based material in many cases, so that the magnets 51 can stick thereto. Therefore, when mounting the sheet 50 for use in a bed to the side surface of the bed 91, ropes or the like are inserted into the grommet holes 14a and are fixed to the vehicle body, and in addition, the magnets 51 are stuck to the side surfaces of the bed 91. Accordingly, the sheet 50 for use in a bed can be mounted easily and reliably on the bed 91. Dismounting of the sheet 50 for use in a bed can be easily performed as well. When mounting a plurality of the sheets 50 for use in a bed on the side surfaces of the bed 91, the plurality of sheets 50 for use in a bed are mounted so as not to form gaps therebetween by overlapping the auxiliary fixing members 52 on the adjacent sheets 50 for use in a bed and fixing them with the magnets 51, whereby the thermal insulation ability is enhanced. There is a case where the front wall surface 92c which is located behind a cabin of the truck 90 has a level differences with respect to the side wall surfaces 92a, 92a. In such a case, the sheet 50 for use in a bed can be mounted while bypassing portions having the level difference by using the auxiliary fixing members 52 for covering the front wall surface 92c.

Figure 9:
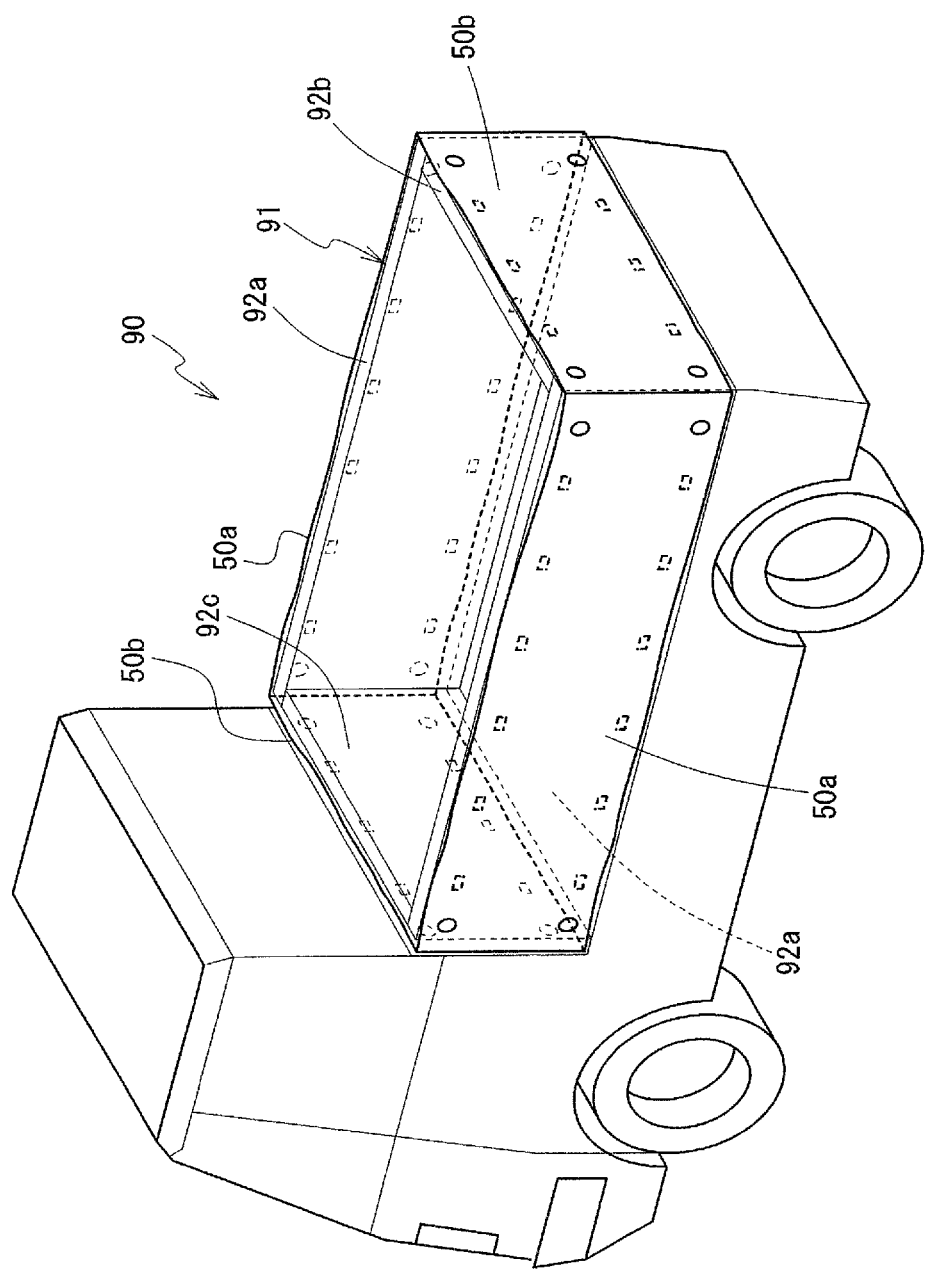
FIG. 9 is a perspective view illustrating a state of mounting the sheet for use in a truck bed according to the third embodiment described above to the truck.

FIG. 9 illustrates an example of mounting of the sheet 50 for use in a bed to the bed 91 of the truck 90. Here, the independent sheets 50 for use in a bed are mounted on the four wall surfaces of the bed 91. In other words, side portion sheets 50a, 50a are mounted on the left and right side wall surfaces 92a, 92a, and sheets for front and rear portion sheets 50b, 50b are mounted on the front wall surface 92c and the rear wall surface 92b. In FIG. 9, the auxiliary fixing members 52, although illustration of which is omitted, are arranged so as to overlap with the adjacent sheets 50 for use in a bed, and are fixed to the adjacent wall surfaces.

Alternatively, one elongated sheet 50 for use in a bed may be mounted over the entire periphery of the wall surfaces at four sides. In any cases, the sheet 50 for use in a bed according to the present embodiment configured to prevent heat radiation from the side surfaces 92a, 92a, 92b, 92c of the bed 91 provides the load on the bed 91 with a high thermal insulation ability by being used together with the sheet 30 for use in a bed according to the first embodiment configured to cover the upper surface of the bed 91 or the sheets 40 for use in a bed according to the second embodiment.

As the sheet for use in a bed to be mounted on the side surfaces 92a, 92a, 92b, 92c of the bed 91, a type which is mounted inside the bed 91 is possible in addition to the type which is mounted outside the bed 91 like the sheet 50 for use in a bed described above. In this case, the magnets for attaching the sheet for use in a bed to the side surfaces of the bed 91 may be attached to the tarpaulin sheet 10 side instead of the polyester canvas 12 side, so that the sheet for use in a bed is mounted to the side surfaces 92a, 92a, 92b, 92c of the bed 91 with the polyester canvas 12 side faced inside the bed 91.

<Thermal Insulating Case>

Figure 10A:
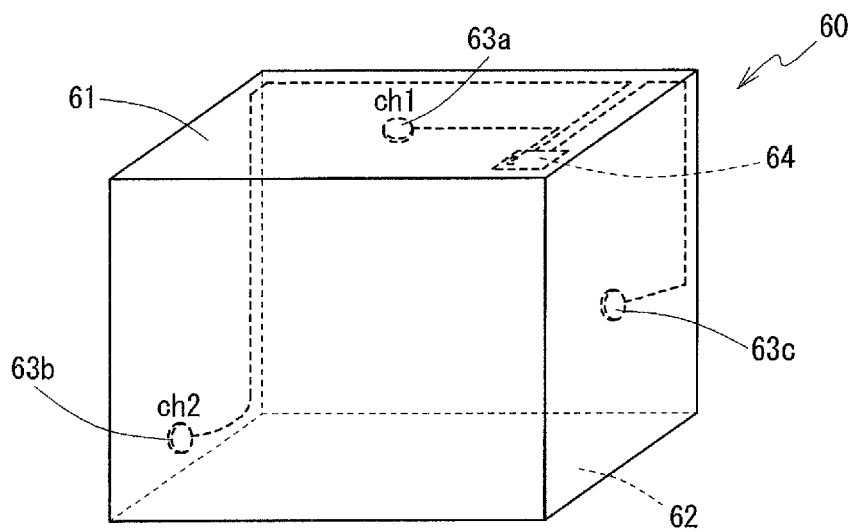
FIG. 10A is a perspective view of entire part.
Figure 10B:
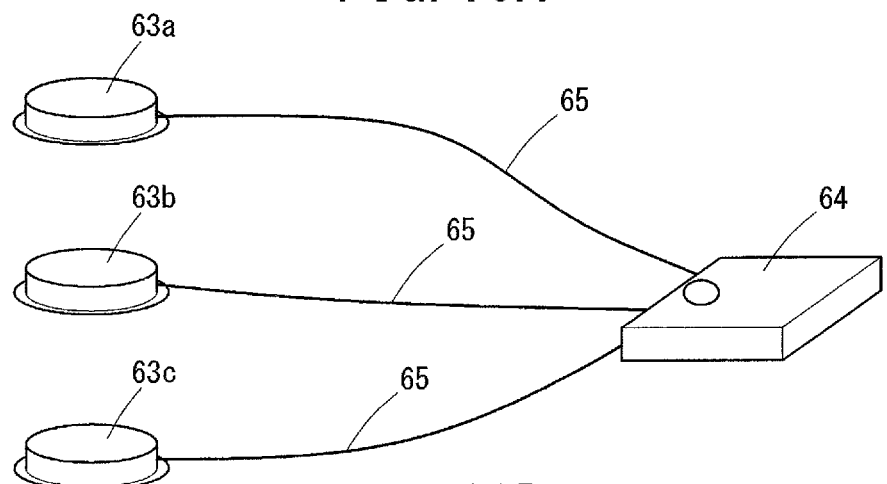
FIG. 10B is a schematic drawing illustrating a connection between a temperature sensor and an IC tag.
Figure 10C:
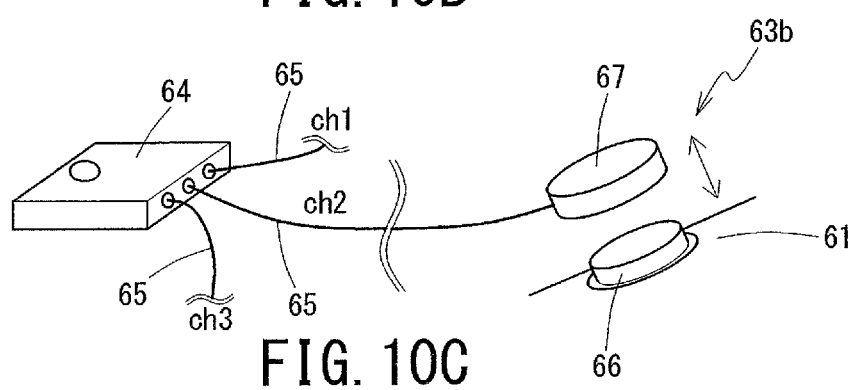
FIG. 10C is a schematic drawing illustrating a mounting portion of the temperature sensor.
Figure 11:
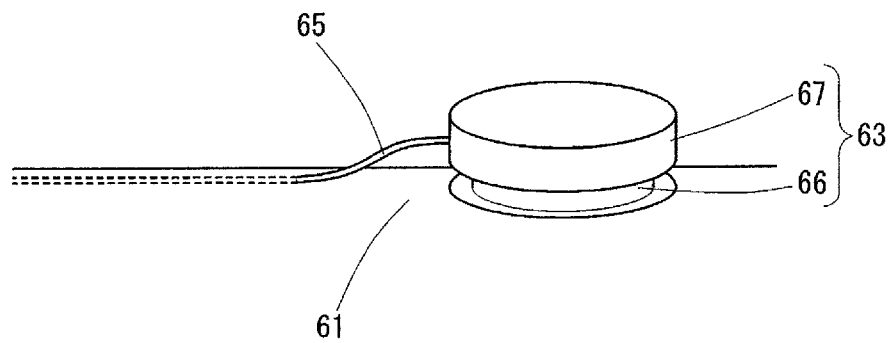
FIG. 11 is an enlarged drawing illustrating a portion of the temperature sensor in the thermal insulating case described above.
Figure 12:
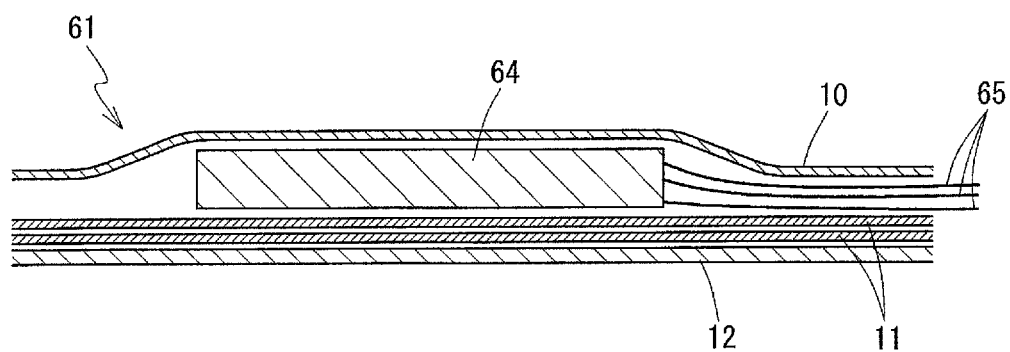
FIG. 12 is a cross-sectional view illustrating a mounting method of the IC tag.

A configuration of a thermal insulating case 60 according to an embodiment of the present invention will be illustrated in FIGS. 10 to 12. The thermal insulating case 60 of the present invention is formed of the thermal insulating sheet 1 according to the embodiment of the present invention described above and covers various objects.

The thermal insulating case 60 comprises a covering portion 61 formed of the above-described thermal insulating sheet 1 as a main body. The covering portion 61 has a box shape having an opening 62 on the lower surface thereof, and seven surfaces other than a surface where the opening 62 is formed are formed of the thermal insulating sheet 1. The thermal insulating sheet 1 is arranged in such a manner that the surface on the tarpaulin sheet 10 side is arranged outside, that is, the atmospheric air side, and the surface on the polyester canvas 12 side is arranged inside, that is, on a box-shaped inner space side.

The opening 62 of the covering portion 61 is arranged above the object placed on a placing surface such as the ground, the floor or the like, then the covering portion 61 is moved downward and the covering portion 61 is set up on the placing surface with an edge of the opening 62 being in contact with the placing surface, whereby the object can be stored in the inner space of the covering portion 61 and be covered therewith. By preventing generation of a gap between the placing surface and the covering portion 61, the object can be covered with the covering portion 61 so as not to come into contact with outside air, and thus the object can be thermally insulated with high degree of efficiency with a simple operation.

The object that is thermally insulated by being covered with the thermal insulating case 60 may be anything. However, since the thermal insulating case 60 has a mode in which the object is covered with the covering portion 61 which is formed into the box shape having the opening 62 in advance from above, handling of the covering portion 61 is easier and a higher thermal insulating efficiency is more likely to be achieved when the thermal insulating case 60 is used for objects stored in a container and having a definite shape than when used for objects having indefinite shapes such as the asphalt mixture supposed to the desirable object to be covered with the sheet for use in a truck bed described above. As the objects described above, medical agents stored in tins, foods stored in box-shaped containers, and drinks are exemplified. The medical agents and the food and drink are required to be maintained at predetermined temperatures, especially at low temperatures for maintaining the quality in many cases. Since the inner surfaces of the covering portion 61 of the thermal insulating case 60 are formed of the polyester canvas 12, and have resistance for various medical agents, the thermal insulating case 60 can be used even though part of the container in which the medical agent is stored is opened.

Preferably, the thermal insulating case 60 further includes a temperature measuring/recording member for temperature control in an interior of the covering portion 61. The temperature measuring/recording member is configured to measure and record the temperature in the interior of the covering portion 61. A portion for measuring the temperature in the temperature measuring/recording member is implemented by a temperature sensor 63 such as a thermistor, a thermocouple and the like. In the present embodiment, the temperature sensor 63 comprises three measuring units of a first channel 63a, a second channel 63b, and a third channel 63c, and measures temperatures at different portions in the covering portion 61. The portions for recording temperatures in the temperature measuring/recording member may be implemented by an IC tag (RFID tag) 64 and the like. As illustrated in FIGS. 10B and 10C, the temperature sensor 63 and the IC tag 64 are interconnected by a signal cable 65, and temperature measured by the respective channels 63a to 63c of the temperature sensor 63 at predetermined time intervals are transmitted to and recorded in the IC tag 64. In the case where the IC tag 64 is used for the temperature measuring/recording member, recorded temperature information can be read out from the outside in a non-contact manner. In other words, cable connecting or the like does not have to be performed while opening part of the covering portion 61 and exposing the object to the atmospheric air for reading out the temperature information in the middle of storage or transport of the object and the like, and hence the thermal insulating effect of the covering portion 61 is not impaired.

An example of configuration and a method of mounting the temperature sensor 63 is illustrated in FIG. 10C and FIG. 11. The temperature sensor 63 comprises an element portion 66 configured to sense the temperature and a measurement connector 67 arranged so as to cover the element portion 66 and configured to output a temperature sensed by the element portion 66 to the IC tag 64 as an electric signal. The element portion 66 is fixed by being embedded in the thermal insulating sheet 1 which constitutes the covering portion 61, and the portion configured to sense the temperature is exposed to a space in the interior of the covering portion 61. The signal cable 65 is connected to the measurement connector 67. In this manner, with the temperature sensor 63 comprising the element portion 66 and the measurement connector 67 separating from each other, flexibility in mounting position of the temperature sensor 63 and convenience of maintenance work are enhanced.

The signal cable 65 connected to the measurement connector 67 is preferably wired to the IC tag 64 through an internal space of the covering portion 61 or a space between the layers of the thermal insulating sheet 1 which constitutes the covering portion 61 (for example, between the tarpaulin sheet 10 and the nonwoven fabric layer 11) as illustrated in FIG. 11. This is for enhancing easiness to handle the thermal insulating case 60. In the case where the temperature sensor 63 is not separated into the element portion 66 and the measurement connector 67 in this example and is configured as an integral member, the temperature sensor 63 fixed to the covering portion 61 and the IC tag 64 are directly connected, and thus flexibility in mounting position of the temperature sensor 63 and convenience of maintenance work are lowered. However, mechanical strength relating to mounting and wiring of the temperature sensor 63 is enhanced.

FIG. 12 is a cross-sectional view illustrating an example of a mounting method of the IC tag 64. Here, the IC tag 64 is fixed by being interposed between the layers of the thermal insulating sheet 1 which constitute the covering portion 61. In other words, the IC tag 64 is arranged between the tarpaulin sheet 10 and the nonwoven fabric layer 11 which constitutes part of the thermal insulating sheet 1. In this configuration, the IC tag 64 is not exposed out from the covering portion 61, and easiness to handle the thermal insulating case 60 is enhanced. As described above, since the IC tag 64 can read out the temperature information in a no-contact manner, being covered with the sheet material does not become an obstacle in reading the temperature.

The thermal insulating case 60 described thus far is configured to block the object heated or cooled to a predetermined temperature in advance from the outside air to maintain the temperature of the object. However, the thermal insulating case 60 may be provided with heating means such as a heater and cooling means such as a freezer in the interior of the covering portion 61. Then, an output of the heating means and the cooling means may be adjusted so that a space in the interior of the covering portion 61 is maintained at a predetermined temperature while referring to the temperature measured by the temperature sensor 63. Then, lowering of the thermal insulation efficiency by inevitable heat transmission via the covering portion 61 may be compensated, so that the object can be maintained at the predetermined temperature.

EXAMPLE

A result of test for confirming a thermal insulation ability of the thermal insulating sheet according to the embodiment of the present invention will be described below as Example.

Example

A thermal insulating sheet of the embodiment of the present invention which is the same as the configuration illustrated in FIGS. 1 to 4 was manufactured as a thermal insulating sheet according to Example. In other words, two polypropylene spunbond nonwoven fabric having a rectangular shape of 2100 mm×5300 mm was interposed between a silver tarpaulin sheet and a polyester canvas having a rectangular shape of 2300 mm×5300 mm, and the tarpaulin sheet and the polyester canvas were fuse-bonded along opposed long sides. In addition, one of short sides of the four layers were stitched with a sewing machine together and the other short side was fuse-bonded. Slits of 55 mm×500 mm were formed at three positions which divide the long side substantially equally on the surface of the polyester canvas side. Cotton ropes having an outer diameter of 16 mm were extended in parallel with the long sides of the slits across center portions of the respective slits, cover sheets of 165 mm×700 mm were arranged further on the cotton ropes to cover the slits, and were stitched to the polyester canvas except for one of short sides thereof. The thickness of the entire thermal insulating sheet was approximately 0.58 mm.

Comparative Examples

A thermal insulating sheet of Comparative Example comprises a burlap bag and a polyester canvas generally used as a sheet for use in a bed for a truck simply overlapped with each other.

(Evaluation of Temperature Decrease at the Time of Asphalt Transport)

The asphalt mixture mixed with a regenerating aggregate was heated and loaded on the bed of two 9-tons trucks. Upper surfaces of the asphalt mixtures were covered with the thermal insulating sheet of Example, and a thermal insulating sheet of Comparative Example, respectively, and the sheets were fixed to the vehicle body. At that time, the thermal insulating sheet of Example was arranged with a surface of the polyester canvas facing the asphalt mixture side, and the thermal insulating sheet of Comparative Example was arranged with a surface on a burlap bag side facing the asphalt mixture side.

The two trucks travelled in the same course in environs of Morioka City for 150 minutes, and during that time, the temperatures of the asphalt mixtures were measured at two minutes intervals. When measuring the temperatures, a thermometer was inserted into top portions of the heaped asphalt mixtures, and temperatures at positions of 0 cm, 5 cm, 25 cm, and 45 cm depth from the top were measured. A depth of 0 cm corresponded to the surface of the asphalt mixture.

Recording of the temperature was performed with a data logger connected to the thermometer. An evaluation test was conducted in March, and the outside temperature was approximately 10° C. when the truck was travelling.

(Result)

Temperatures of the asphalt mixtures before and after the truck has travelled for 150 minutes are shown in Table 1 and Table 2 described below. Table 1 shows a result relating to the thermal insulating sheet of Example, and Table 2 shows a result relating to the thermal insulating sheet of Comparative Example. Temperatures shown in Tables are average of temperatures measured for approximately 10 minutes in order to avoid an influence of measurement error.

TABLE 1

| | Measured Depth [cm] | | | |
|---|---|---|---|---|
| | 0 | 5 | 25 | 45 |
| Temperature Before Travel [° C.] | 108 | 147 | 156 | 156 |
| Temperature After Travel [° C.] | 106 | 136 | 153 | 155 |
| Temperature Decrease [° C.] | 2 | 11 | 3 | 1 |

TABLE 2

|  | Measured Depth [cm] | | | |
| --- | --- | --- | --- | --- |
|  | 0 | 5 | 25 | 45 |
| Temperature Before Travel [° C.] | 115 | 144 | 153 | 152 |
| Temperature After Travel [° C.] | 80 | 128 | 152 | 149 |
| Temperature Decrease [° C.] | 35 | 16 | 1 | 3 |

In the case where a depth of measurement was 25 cm and 45 cm, there was no much difference in the amount of the temperature decrease between the case where the thermal insulating sheet of Example was used and the case where the thermal insulating sheet of Comparative Example was used. The reason is that significant heat radiation itself does not occur in the interior of the heaped asphalt mixture irrespective of the type of the thermal insulating sheet.

In contrast, when results of measurement at a depth of 0 cm and measurement at a depth of 5 cm, which were in the vicinity of the surface were compared, the amount of the temperature decrease was significantly smaller in the case where the thermal insulating sheet of Example was used than in the case where the thermal insulating sheet of Comparative Example was used. In a depth of measurement of 5 cm, in the case where the thermal insulating sheet of Comparative Example was used, a temperature decrease of 16° C. was accompanied, while in the case where the thermal insulating sheet of Example was used, only a temperature decrease of 11° C. was accompanied. In addition, at a measurement depth of 0 cm, the temperature decrease reached 35° C. in the case where the thermal insulating sheet of Comparative Example was used, while a temperature decrease of only 2° C. was accompanied in the case where the thermal insulating sheet of Example was used. In this manner, by using the thermal insulating sheet of Example, a temperature decrease was significantly restricted in the vicinity of the surface of the asphalt mixture which is susceptible to heat radiation as well, and the fact that the thermal insulating sheet of Example had a high thermal insulation ability has been demonstrated. The reason why the amount of temperature decrease at a depth of measurement of 0 cm was specifically small in the case where the thermal insulating sheet of Example was used was considered to be because convection of air trapped in the area covered with the thermal insulating sheet was achieved in a state in which little heat was taken away.

In this manner, it was found that heat radiation from the asphalt mixture was significantly reduced by using the thermal insulating sheet of the embodiment of the present invention. It was also found that such a high thermal insulation ability was sufficiently exerted in the case where the slits for degassing are formed in the polyester canvas which constitutes part of the thermal insulating sheet as well. Accordingly, generation of a block of the asphalt mixture formed by being partly cooled and thus lowering of workability and finish is prevented. In general, if the temperature decrease during transport is on the order of 10° C., reheating of the asphalt mixture at the building site is no longer necessary.

Although the embodiment of the present invention has been described in detail thus far, the present invention is not limited to the embodiment and the example described above, and various modifications may be made without departing the scope of the present invention. The sheet for use in a truck bed of the embodiments described above comprises a thermal insulating sheet having a predetermined laminated structure and slits, has a shape which further improves easiness to handle, and is provided with a member which improve easiness to handle such as a magnet. With the sheet for use in a truck bed comprising a given thermal insulating sheet having the same shape and having the same member added thereto, an effect of significant easiness to handle of the shape itself may be achieved.

Also, the thermal insulating case of the embodiments described above, as described already, may be used for maintaining the object at temperatures higher than the ambient temperature, and for maintaining the object at lower temperatures. The thermal insulating case of the present invention is formed by using the thermal insulating sheet of the embodiment described above, and has slits (through holes) for degassing on the surfaces of the polyester canvas. However, in the case where the thermal insulating case is used only for the purpose of retaining the object at a low temperature, these slits do not necessarily have to be formed.

What is claimed is:

1. A thermal insulating sheet comprising:
   a laminated member comprising a tarpaulin sheet, a plurality of synthetic resin nonwoven fabric sheets, and a polyester canvas, with the plurality of synthetic resin nonwoven fabric sheets being provided between the tarpaulin sheet and the polyester canvas; and
   wherein a perimeter of the laminated member possesses at least a part where at least the tarpaulin sheet and the polyester canvas are fuse-bonded; and
   remaining parts where the laminated member is stitched together, and
   wherein the polyester canvas possesses one or more through holes, through which air can enter into and exit out of the laminated member, whereas the tarpaulin sheet does not possess any through holes.

2. The thermal insulating sheet according to claim 1; wherein the polyester canvas of the laminated member is provided with one or more string-shaped members across said one or more through holes, and one or more sheet strips over said one or more string-shaped members covering said one or more through holes.

3. The thermal insulating sheet according to claim 2; wherein the tarpaulin sheet and the nonwoven fabric sheet are fixed to each other with hook-and-loop fasteners.

4. A sheet for use in a truck bed formed of the thermal insulating sheet according to claim 3; wherein the sheet for use in a truck bed is configured to cover an upper surface of a bed of a truck with the tarpaulin sheet faced upward.

5. The sheets for use in a truck bed according to claim 4, comprising two sheets divided in a widthwise direction of the truck; wherein the divided sheets are configured to be mounted on scattering prevention devices which are mounted on upper ends of side gate boards of the bed and cover the upper surface of the bed in a retractable manner.

6. The sheets for use in a truck bed according to claim 5; wherein the divided sheets have hook-and-loop fasteners, and the divided sheets are configured to be fixed to pipe frames which constitute the scattering prevention devices using the hook-and-loop fasteners.

7. A sheet for use in a truck bed formed of the thermal insulating sheet according to claim 3; wherein the sheet for use in a truck bed is configured to be mounted on a side surface of the bed of a truck with the tarpaulin sheet faced outward of the bed.

8. The sheet for use in a truck bed according to claim 7, wherein one or more magnets are attached on a surface of the polyester canvas.

9. A thermal insulating case wherein the thermal insulating sheet according to claim 3 is formed into a box shape having an opening, with the tarpaulin sheet faced outward.

10. The thermal insulating case according to claim 9, comprising: a temperature measuring/recording member configured to measure and record temperatures in an interior of the thermal insulating case.

11. The thermal insulating case according to claim 10; wherein the temperature measuring/recording member records the temperature in an IC tag.

12. The thermal insulating sheet according to claim 1; wherein the tarpaulin sheet and the nonwoven fabric sheet are fixed to each other with hook-and-loop fasteners.

13. A sheet for use in a truck bed formed of the thermal insulating sheet according to claim 1; wherein the sheet for use in a truck bed is configured to cover an upper surface of a bed of a truck with the tarpaulin sheet faced upward.

14. The sheets for use in a truck bed according to claim 13, comprising two sheets divided in a widthwise direction of the truck; wherein the divided sheets are configured to be mounted on scattering prevention devices which are mounted on upper ends of side gate boards of the bed and cover the upper surface of the bed in a retractable manner.

15. The sheets for use in a truck bed according to claim 14, wherein the divided sheets have hook-and-loop fasteners, and the divided sheets are configured to be fixed to pipe frames which constitute the scattering prevention devices using the hook-and-loop fasteners.

16. A sheet for use in a truck bed formed of the thermal insulating sheet according to claim 1; wherein the sheet for use in a truck bed is configured to be mounted on a side surface of the bed of a truck with the tarpaulin sheet faced outward of the bed.

17. The sheet for use in a truck bed according to claim 16, wherein one or more magnets are attached on a surface of the polyester canvas.

18. A thermal insulating case wherein the thermal insulating sheet according to claim 1 is formed into a box shape having an opening, with the tarpaulin sheet faced outward.

19. The thermal insulating case according to claim 18, comprising: a temperature measuring/recording member configured to measure and record temperatures in an interior of the thermal insulating case.

20. The thermal insulating case according to claim 19; wherein the temperature measuring/recording member records the temperature in an IC tag.

\* \* \* \* \*